(12) United States Patent
Raghoonandan et al.

(10) Patent No.: US 11,219,324 B2
(45) Date of Patent: Jan. 11, 2022

(54) CUPHOLDER ASSEMBLY AND TABLE INCLUDING THE SAME

(71) Applicant: Gulfstream Aerospace Corporation, Savannah, GA (US)

(72) Inventors: Anand Raghoonandan, Savannah, GA (US); Jacob Norton, Savannah, GA (US); Yves Caron, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 16/841,969

(22) Filed: Apr. 7, 2020

(65) Prior Publication Data
US 2021/0307548 A1 Oct. 7, 2021

(51) Int. Cl.
| | | |
|---|---|---|
| *A47G 23/02* | (2006.01) | |
| *A47B 1/04* | (2006.01) | |
| *A47B 13/08* | (2006.01) | |
| *B60N 3/10* | (2006.01) | |
| *B60N 3/00* | (2006.01) | |

(52) U.S. Cl.
CPC ............ *A47G 23/0225* (2013.01); *A47B 1/04* (2013.01); *A47B 13/088* (2013.01); *B60N 3/001* (2013.01); *B60N 3/103* (2013.01)

(58) Field of Classification Search
CPC ......... A47B 13/16; A47B 13/088; A47B 1/04; A47G 23/0225; A47G 23/0208; B60N 3/001; B60N 3/10; B60N 3/103
USPC ........................ 108/20, 44, 45, 42; 248/206.5
See application file for complete search history.

(56) References Cited

U.S. PATENT DOCUMENTS

| | | | | |
|---|---|---|---|---|
| 720,842 | A * | 2/1903 | Peace ....................... | A47B 1/04 108/77 |
| 2,799,549 | A * | 7/1957 | Luxford ................... | A47B 1/04 108/81 |
| 2,942,921 | A * | 6/1960 | Rachman ............. | A47B 3/0916 108/26 |
| 3,606,112 | A * | 9/1971 | Cheshier ................ | B60N 3/102 224/554 |
| 3,899,982 | A * | 8/1975 | Fetzek ................... | B60N 3/102 108/25 |
| 4,453,759 | A * | 6/1984 | Kathiria ................. | B60N 2/793 296/37.8 |
| 4,792,174 | A * | 12/1988 | Shioda .................... | B60N 3/002 108/45 |
| 4,892,281 | A * | 1/1990 | DiFilippo .............. | B60N 3/102 248/240.1 |
| 4,953,771 | A * | 9/1990 | Fischer .................. | B60N 3/102 108/44 |

(Continued)

*Primary Examiner* — Jose V Chen
(74) *Attorney, Agent, or Firm* — LKGlobal | Lorenz & Kopf, LLP

(57) ABSTRACT

A cupholder assembly adapted to be mounted to a support structure and a table including a cupholder assembly are provided. In one example, the cupholder assembly includes a housing that extends in a distal direction from a proximal housing portion to a distal housing portion. The housing is configured to pivotally couple to the support structure to move between a mounted position and a rotated position that is rotated relative to the mounted position. A cupholder subassembly is slidingly coupled to the housing to move between a stowed position substantially within the housing and a deployed position extending from the housing in the distal direction.

17 Claims, 7 Drawing Sheets

(56) References Cited

U.S. PATENT DOCUMENTS

| | | | | |
|---|---|---|---|---|
| 5,297,767 A * | 3/1994 | Miller | B60N 3/102 | 248/311.2 |
| 5,379,978 A * | 1/1995 | Patel | B60N 3/102 | 224/281 |
| 5,445,350 A * | 8/1995 | Rigsby | B60N 3/102 | 224/552 |
| 5,692,658 A * | 12/1997 | Fischer | B60N 3/102 | 224/281 |
| 5,692,718 A * | 12/1997 | Bieck | B60N 3/102 | 248/311.2 |
| 5,876,007 A * | 3/1999 | Lancaster | B60N 3/102 | 248/311.2 |
| 5,897,089 A | 4/1999 | Lancaster et al. | | |
| 6,450,468 B1 * | 9/2002 | Hamamoto | B60N 3/108 | 248/311.2 |
| 6,766,747 B1 * | 7/2004 | Wolfe | A47B 13/081 | 108/26 |
| 6,779,769 B1 * | 8/2004 | York | B60N 3/102 | 224/926 |
| 8,176,855 B1 * | 5/2012 | Cannon | A47G 23/06 | 108/25 |
| 8,336,841 B2 * | 12/2012 | Ercolano | B60N 3/108 | 248/311.2 |
| 9,643,525 B2 * | 5/2017 | Dargavell | B60N 3/106 | |
| 10,390,612 B2 | 8/2019 | Desaulles et al. | | |
| 2013/0082492 A1 | 4/2013 | Andersson et al. | | |
| 2015/0144035 A1 * | 5/2015 | Molteni | A47B 88/477 | 108/26 |
| 2016/0001885 A1 * | 1/2016 | Curtis | B60N 3/101 | 108/28 |
| 2016/0113142 A1 * | 4/2016 | Moon | H04B 1/3818 | 361/807 |
| 2016/0244169 A2 | 8/2016 | Gagnon et al. | | |
| 2019/0152373 A1 | 5/2019 | Hirano et al. | | |
| 2019/0210732 A1 | 7/2019 | Green et al. | | |
| 2020/0114938 A1 * | 4/2020 | Le Corre | A47B 1/04 | |

* cited by examiner

CUPHOLDER ASSEMBLY AND TABLE INCLUDING THE SAME

TECHNICAL FIELD

The technical field relates generally to cupholders, and more particularly, relates to cupholder assemblies adapted to be mounted to a support structure such as a table or the like, and tables including such cupholder assemblies.

BACKGROUND

Providing adequate and practical areas for dining and/or other activities is of particular interest for many vehicle manufacturers. For example, in an aircraft, it is desirable to provide a table(s) for passengers and/or other occupants for meals, snacks, and/or other activities during a flight. However, space is limited and often such support structures need to be configured to be foldable and/or retractable for being partially or fully stowed out of the way, for example, for passenger ingress and/or egress.

Further, often such tables don't include a functional location for passengers to place their glasses, bottles, or other beverage containers. For example, some tables provide an indentation for placement of a beverage container, but such indentations are typically shallow, and the beverage container can easily tip over spilling its contents during movement of the vehicle.

Accordingly, it is desirable to provide a cupholder assembly and table including a cupholder assembly that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a cupholder assembly adapted to be mounted to a support structure, and various non-limiting embodiments of a table including a cupholder assembly, are provided herein.

In a first non-limiting embodiment, the cupholder assembly includes, but is not limited to, a housing that extends in a distal direction from a proximal housing portion to a distal housing portion. The housing is configured to pivotally couple to the support structure to move between a mounted position and a rotated position that is rotated relative to the mounted position. The cupholder assembly further includes, but is not limited to, a cupholder subassembly. The cupholder subassembly is slidingly coupled to the housing to move between a stowed position substantially within the housing and a deployed position extending from the housing in the distal direction.

In another non-limiting embodiment, the table includes, but is not limited to, a tabletop having an upper surface for supporting an object and a lower surface opposite the upper surface. The table further includes, but is not limited to, a cupholder assembly that is mounted to the tabletop. The cupholder assembly includes, but is not limited to, a housing that is pivotally coupled to the tabletop to move between a mounted position adjacent to the lower surface and a rotated position that is rotated relative to the mounted position. The cupholder assembly further includes, but is not limited to, a cupholder subassembly. The cupholder subassembly is slidingly coupled to the housing to move between a stowed position substantially within the housing and a deployed position extending distally from the housing.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
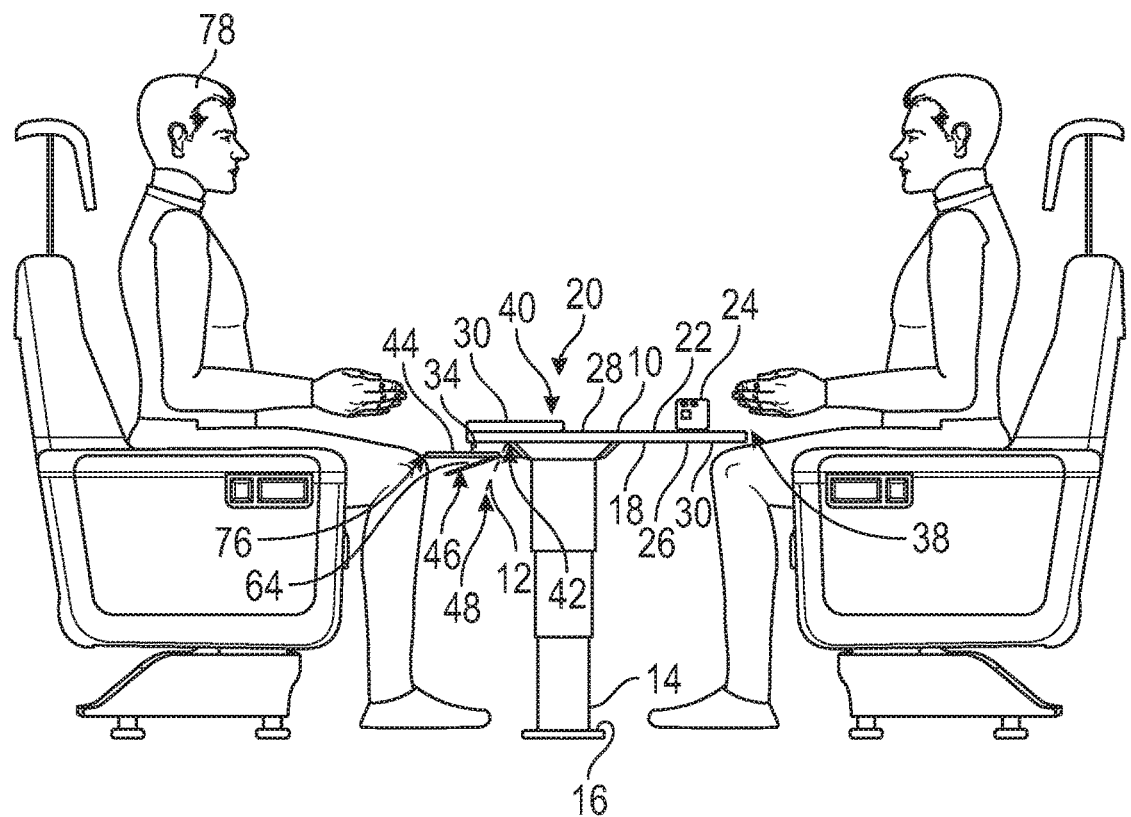
FIG. 1 illustrates a side view of a table including a cupholder assembly in accordance with an exemplary embodiment.
Figure 2:
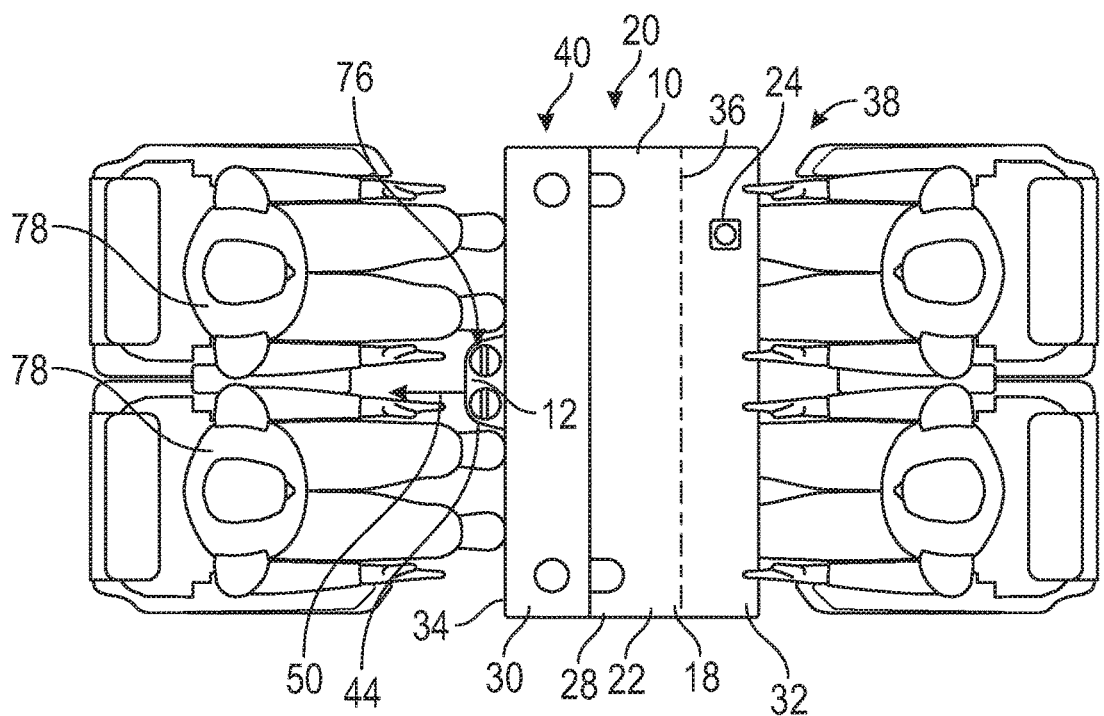
FIG. 2 illustrates a top view of a table including a cupholder assembly in accordance with an exemplary embodiment.
Figure 3:
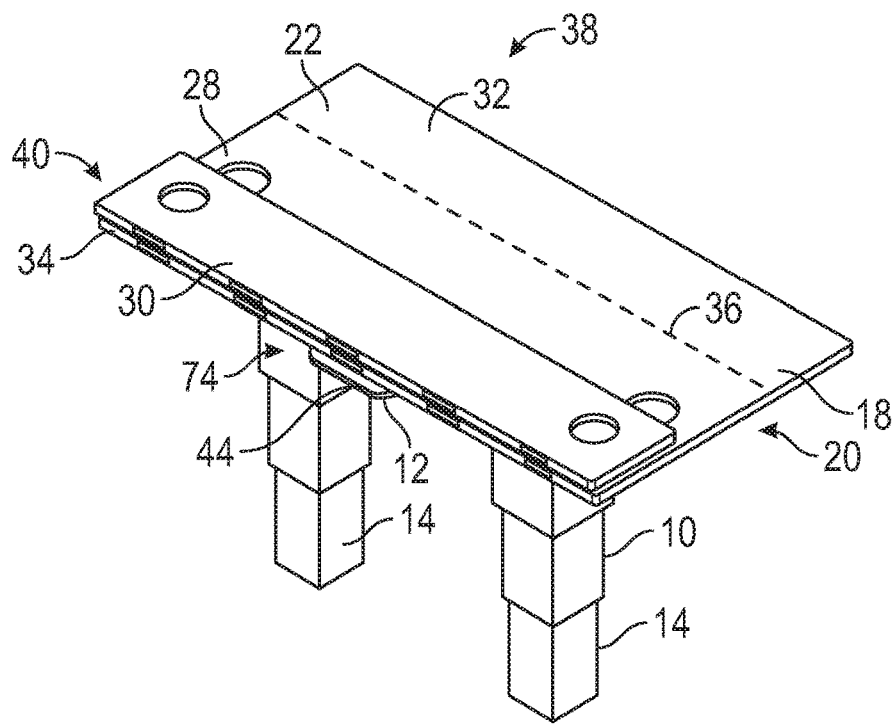
FIG. 3 illustrates a perspective top view of a table including a cupholder assembly in accordance with an exemplary embodiment.
Figure 4:
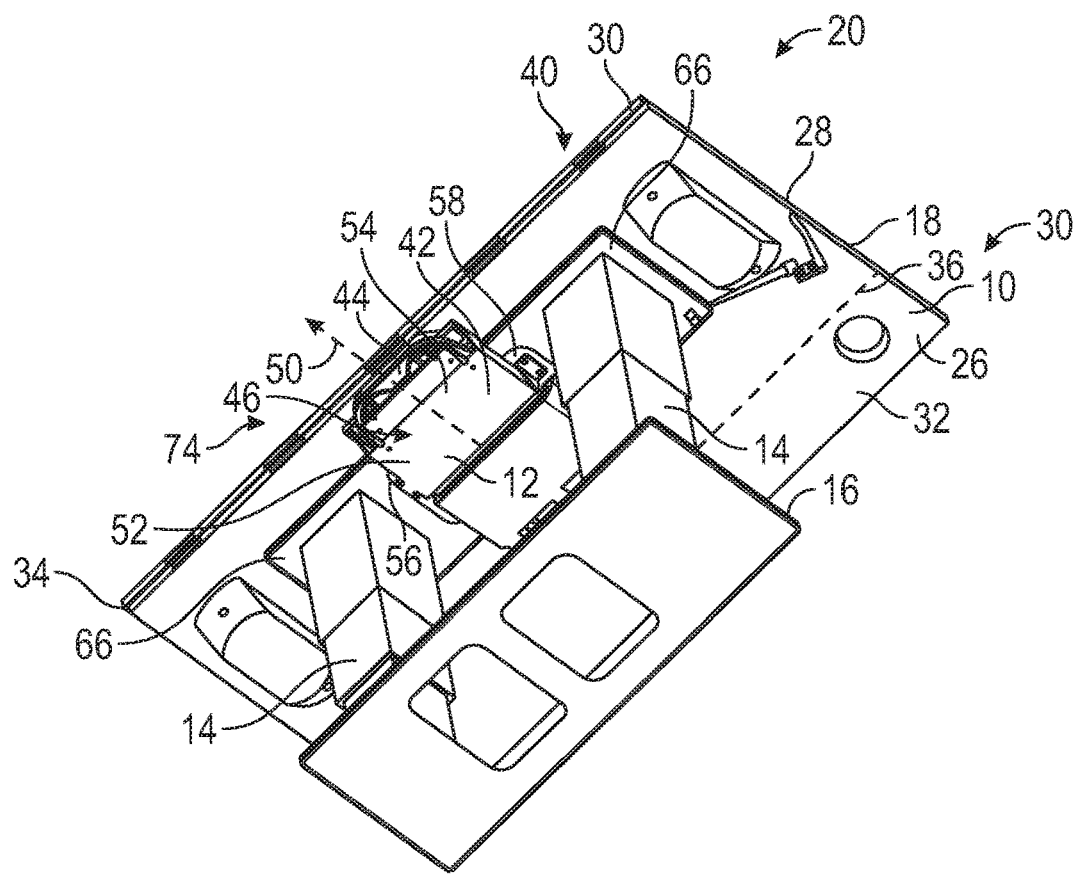
FIG. 4 illustrates a perspective bottom view of a table including a cupholder assembly in accordance with an exemplary embodiment.
Figure 5:
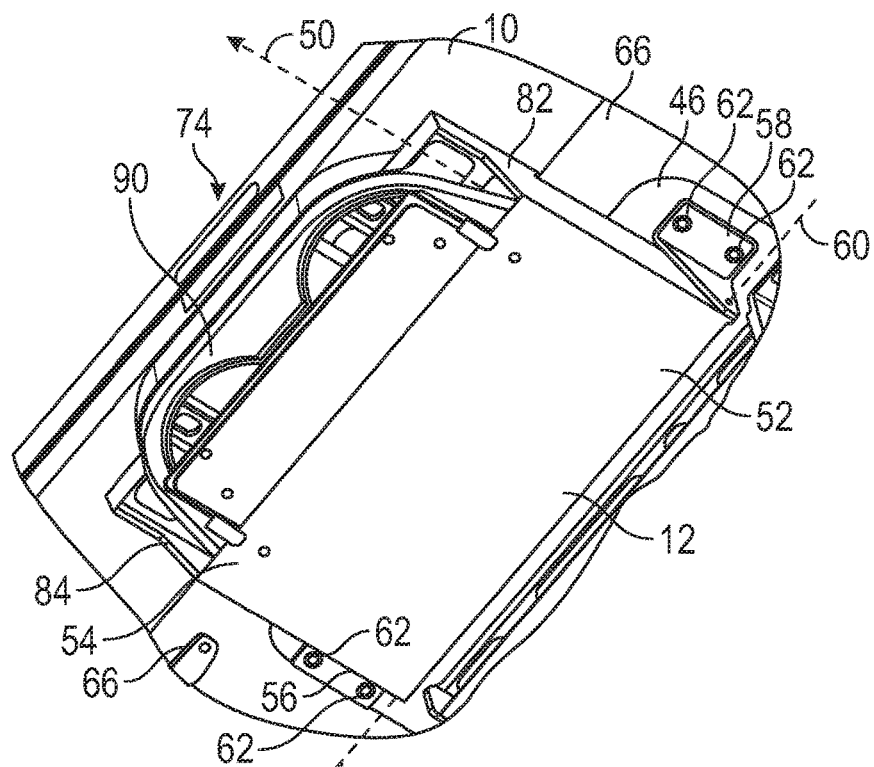
FIG. 5 illustrates a perspective bottom view of a portion of a table including a cupholder assembly in accordance with an exemplary embodiment.
Figure 6:
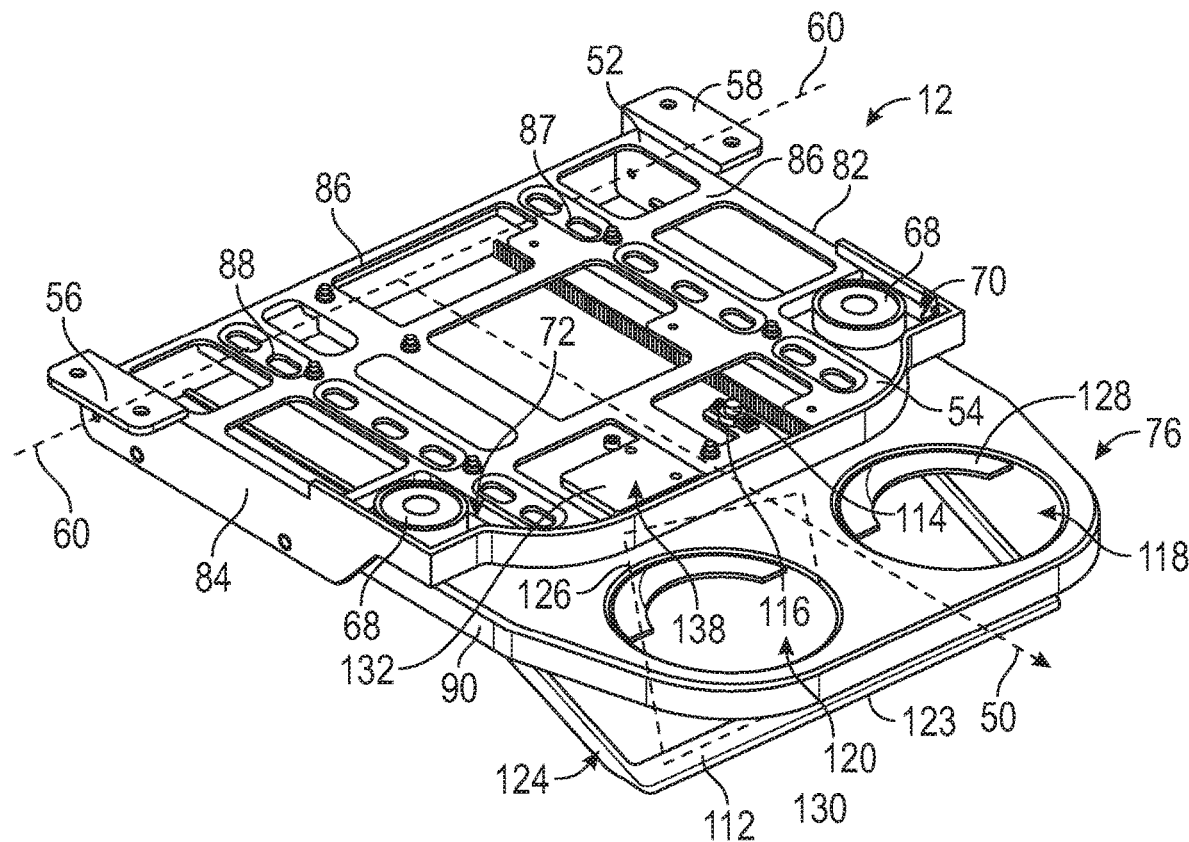
FIG. 6 illustrates a perspective top view of a cupholder assembly in accordance with an exemplary embodiment.
Figure 7:
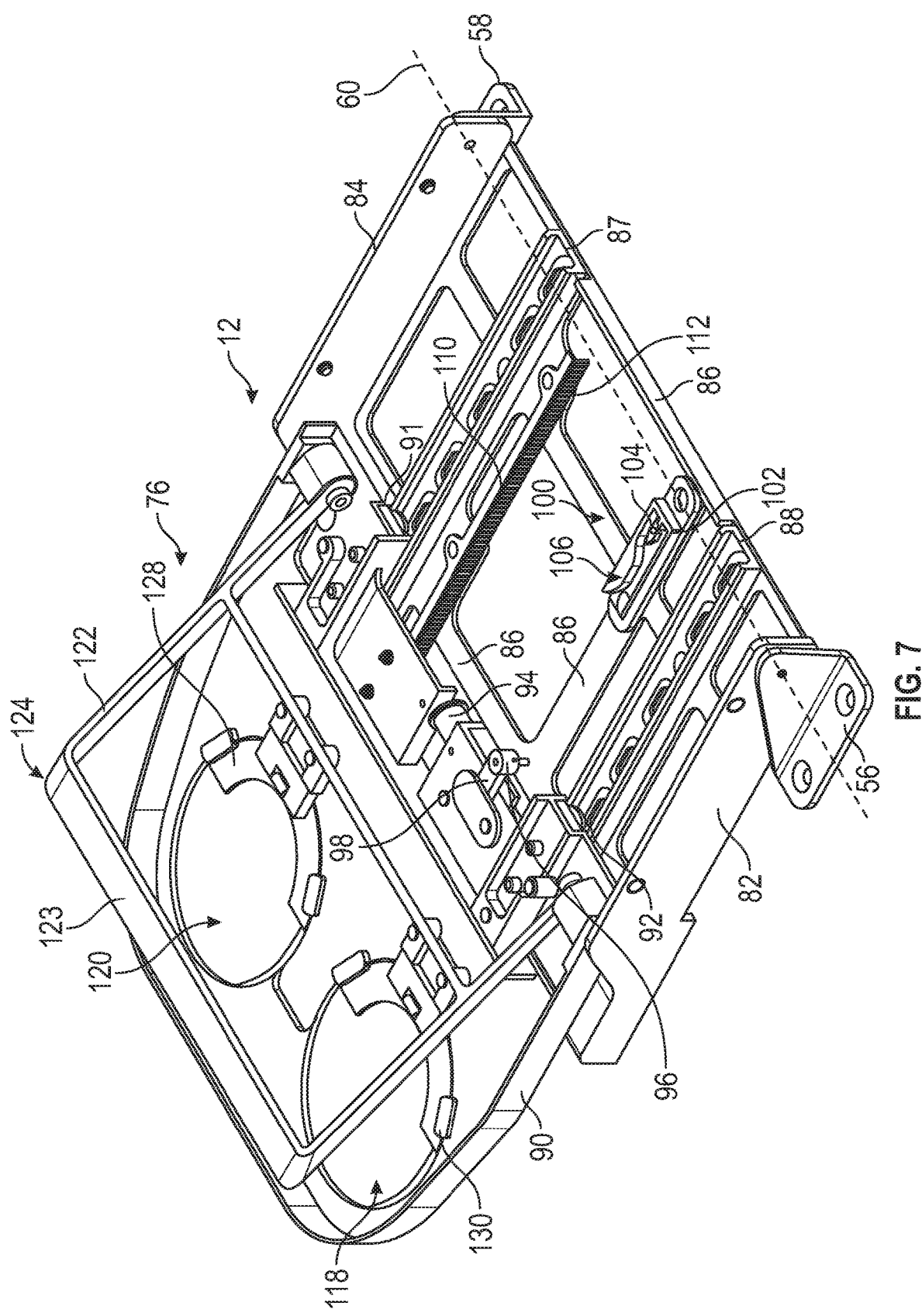
FIG. 7 illustrates a perspective bottom view of a cupholder assembly in accordance with an exemplary embodiment.
Figure 8:
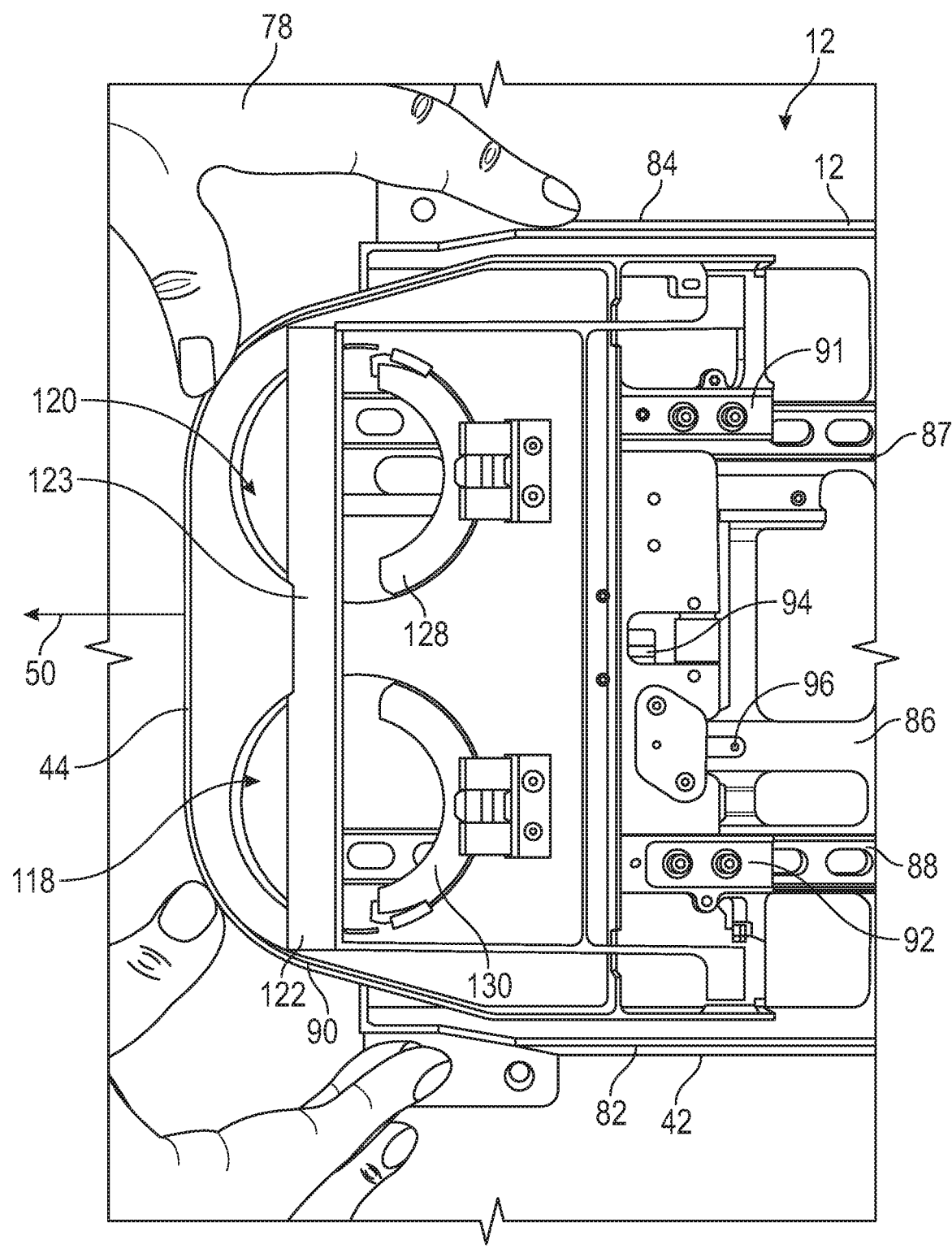
FIG. 8 illustrates a bottom view of a cupholder assembly in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various nonlimiting embodiments contemplated herein relate to a cupholder assembly adapted to be mounted to a support structure and a table including such a cupholder assembly. In one nonlimiting embodiment, the cupholder assembly is mounted to a support structure, which is a table. The table includes a tabletop having an upper surface for supporting an object and a lower surface opposite the upper surface.

The cupholder assembly is mounted to the tabletop and includes a housing and a cupholder subassembly. The housing is pivotally coupled to the tabletop to move between a mounted position adjacent to the lower surface and a rotated position that is rotated relative to the mounted position. The cupholder subassembly is slidingly coupled to the housing to move from a stowed position substantially within the housing and under the tabletop to a deployed position extending distally from the housing away from the tabletop to present the cupholder assembly to a user.

In an exemplary embodiment, the cupholder subassembly includes a cupholder opening and a cupholder support that is disposed under the cupholder opening when the cupholder subassembly is in the deployed position to support a beverage container for removable access to the user. When not in use, the cupholder subassembly can be efficiently moved to the stowed position under the tabletop, out of the way of the user and/or any other nearby persons. Further, in an exemplary embodiment, advantageously by pivotally coupling the housing to the tabletop to move between the mounted position adjacent to the lower surface and the rotated position that is rotated relative to the mounted position, a fail-safe method by which the cupholder assembly can be removed from the ingress/egress path can be achieved even if the cupholder subassembly is in the deployed position.

FIGS. 1-4 illustrate various views of a table 10 including a cupholder assembly 12 in accordance with an exemplary embodiment. The table 10 includes telescoping pedestals 14 that extend upward from the floor 16 and that supports a tabletop 18. The telescoping pedestals 14 are expandable in the vertical direction to move or otherwise raise the tabletop 18 from a retracted position on or adjacent to the floor 16 to an extended position 20 spaced apart from the floor 16. Although the table 10 is shown as including the telescoping pedestals 14, it is to be understood that the table 10 may be configured as any sort of table, for example, on a fixed pedestal(s) or otherwise, and that embodiments of the cupholder assembly 12 can be used for such tables or other support structure(s).

The tabletop 18 has an upper surface 22 for supporting an object 24 and a lower surface 26 opposite the upper surface 22 and adjacent to the telescoping pedestals 14. In an exemplary embodiment, the tabletop 18 is foldable and includes an intermediate table section 28 disposed between foldable leaf sections 30 and 32. In particular, the intermediate table section 28 has opposing intermediate table edges 34 and 36 and the foldable leaf sections 30 and 32 are pivotably coupled to the intermediate table section 28 correspondingly adjacent to the opposing intermediate table edges 34 and 36 to move from an extended position 38 extending distally (e.g., outwardly) from the intermediate table section 28 to a folded position 40 overlying the upper surface 22 of the intermediate table section 28. As illustrated, the foldable leaf section 30 is in the folded position 40 and the foldable leaf section 32 is in the extended position 38, but it is to be understood that the foldable leaf section 30 can be moved to the extended position 38 and, independently, the foldable table leaf section 32 can be moved to the folded position 40.

In an exemplary embodiment, the cupholder assembly 12 is mounted to the tabletop 18. As illustrated, the cupholder assembly 12 is mounted to the lower surface 26 of the intermediate table section 28 adjacent to and inboard of the intermediate table edge 34. The cupholder assembly 12 includes a housing 42 and a cupholder subassembly 44.

Referring to FIGS. 1-7, the housing 42 is pivotally coupled to the tabletop 18 to move between a mounted position 46 (shown in FIGS. 1-5) adjacent to the lower surface 26 and a rotated position 48 (shown in FIG. 1 and as discussed further below in FIG. 10) that is rotated relative to the mounted position 46. In an exemplary embodiment, the housing 42 extends in a distal direction (indicated by single headed arrow 50) from a proximal housing portion 52 to a distal housing portion 54. Mounting brackets 56 and 58 are secured to the intermediate table section 28 via threaded fasteners 62 and are independently pivotally coupled to opposing sidewalls 82 and 84 of the proximal housing portion 52 about a rotational axis 60 via pins or the like so that the housing 42 can rotate about the rotational axis 60 between the mounted position 46 and the rotated position 48.

In an exemplary embodiment, the distal housing portion 54 is releasably coupled to the intermediate table section 28 to hold the housing 42 in the mounted position 46 and to allow the housing 42 to move between the mounted position 46 and the rotated position 48 about the rotational axis 60 when the distal housing portion 54 is released from the intermediate table section 28. As will be discussed in further detail below, the cupholder assembly 12 is configured to be frangible or to break away from the table 10 in the mounted position 46 when a force or predetermined load is applied to thereby release the distal housing portion 54 from the intermediate table section 28 to allow the housing 42 to move from the mounted position 46 to the rotated position 48.

In an exemplary embodiment, the housing 42 in the mounted position 46 is substantially parallel to the lower surface 26 of the intermediate table section 28. When the housing 42 is moved to the rotated position 48, the housing 42 is positioned at an angle 64 of from about 45° to about 90° relative to the lower surface 26 of the intermediate table section 28 and/or the housing 42 in the mounted position 46.

In an exemplary embodiment, the tabletop 18 includes a metal-containing area 66 (e.g., ferromagnetic metal plate such as a steel plate or the like) that is disposed along the lower surface 26 of the intermediate table section 28 over the housing 42. As illustrated, the housing 42 includes magnets 68 that are coupled to the distal housing portion 54 in pockets 70 and 72 just inboard the opposing lateral sidewalls 82 and 84 of the housing 42. In an exemplary embodiment, the magnets 68 releasably couples to the metal-containing area 66 to hold the housing 42 in the mounted position 46. As will be discussed in further detail below, in response to an external force or predetermined load applied to the cupholder assembly 12, the magnets 68 breakaway (e.g., separate) from the metal-containing area 66 to release the distal housing portion 54 from the intermediate table section 28 to allow the housing to move to the rotated position 48.

With continuing reference to FIGS. 1-7, the cupholder subassembly 44 is slidingly coupled to the housing 42 to move (e.g., move forward away from the table 10 and rearward towards the table 10 and vice versa) between a stowed position 74 and a deployed position 76. As illustrated, the housing 42 of the cupholder assembly 12 is disposed adjacent to and inboard of the intermediate table edge 34. In the stowed position 74, the cupholder subassembly 44 is substantially within the housing 42, covered by the intermediate table section 28 so that the cupholder assembly 12 is hidden from a user 78 regardless of whether or not the foldable leaf section 30 is in the folded position 40 or the extended position 38. In an exemplary embodiment, when the foldable leaf section 30 is in the folded position 40 and the cupholder subassembly 44 is in the deployed position 76 extending from the housing 42 in the distal direction 50, the cupholder subassembly 44 extends away from the intermediate table section 28 exposed to the user 78.

Referring to FIGS. 5-8, as illustrated, the housing 42 includes the sidewalls 82 and 84 and a support frame 86 that extends between and is coupled to the sidewalls 82 and 84.

In an exemplary embodiment, the housing 42 has bearing rails 87 and 88 that are attached to or formed in the support frame 86 and that extend in the distal direction 50. The cupholder subassembly 44 has a cupholder body portion 90 movably disposed in the housing 42 between the sidewalls 82 and 84 adjacent to the support frame 86. Bearing carriages 91 and 92 are attached to the cupholder body portion 90 and are slidingly coupled to or engage with the bearing rails 87 and 88 to guide the cupholder subassembly 44 to move between the stowed position 74 and the deployed position 76.

In an exemplary embodiment, the cupholder assembly 12 includes a push-push mechanism (e.g., push to present mechanism) for the user 78 to deploy the cupholder subassembly 44 from the stowed position 74 to the deployed position 76. The push-push mechanism includes a spring 94 (e.g., coil spring or the like) that is coupled at one end to the cupholder body portion 90 and at the other end to the support frame 86 of the housing 42. In an exemplary embodiment, the spring 94 is substantially unwound or extended when the cupholder subassembly 44 is in the stowed position 74 and coils-up to move the cupholder subassembly 44 to the deployed position 76 to bias the cupholder subassembly 44 in the deployed position 76 as the spring 94 substantially or fully coils.

Figure 9:
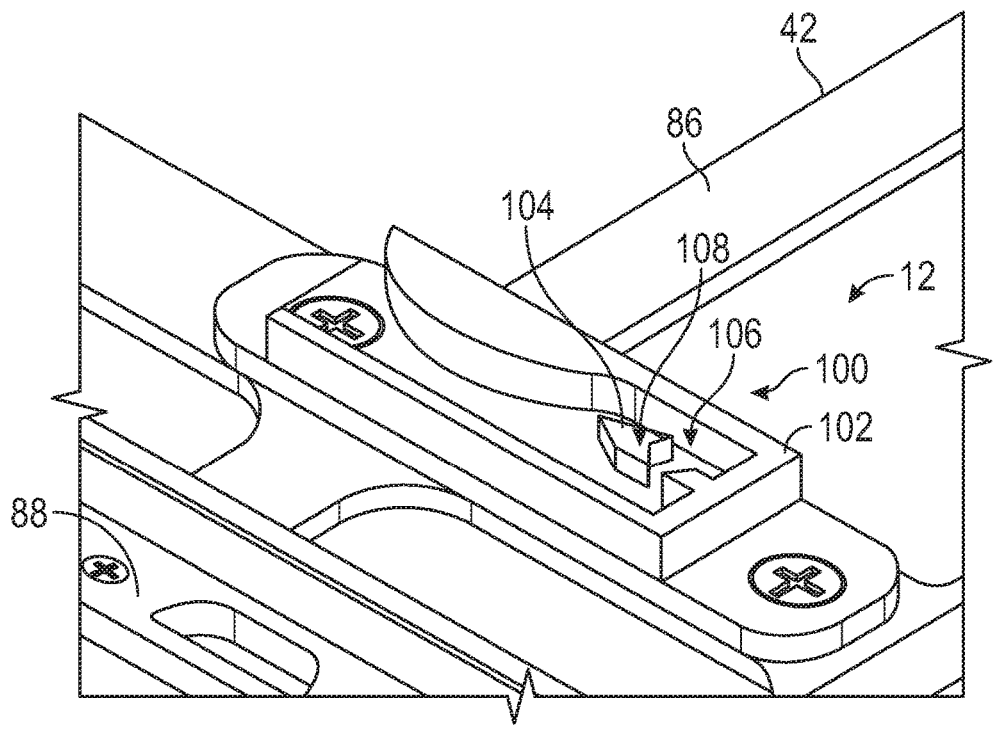
FIG. 9 illustrates a perspective view of a portion of a cupholder assembly in accordance with an exemplary embodiment.

In an exemplary embodiment, the push-push mechanism of the cupholder assembly 12 is actuated by the user 78 pushing the cupholder subassembly 44 rearward in a direction towards the table 10 opposite the distal direction 50. In particular, the push-push mechanism further includes a movable pin 96 that is configured to move laterally (indicated by double headed arrow 98) relative to the cupholder subassembly 44 but is carried by and moves with the cupholder subassembly 44 in the distal direction 50 and vice versa (e.g., forward and rearward directions). The movable pin 96 extends from the cupholder subassembly 44 towards the support frame 86 of the housing 42. Referring also to FIG. 9, the housing 42 has a releasable lock member 100 that is coupled to the support frame 86 and that includes a raised outer portion 102 partially surrounding a raised intermediate portion 104 to define a track 106. The raised intermediate portion 104 has a lock detent 108 on its rearward side. In an exemplary embodiment, when the user 78 pushes the cupholder assembly 44 in the stowed position 74 towards the table 10, the movable pin 96, which is disposed in the lock detent 108, moves rearward out of the lock detent 108 while the spring 94 biases or otherwise moves the cupholder subassembly 44 forward towards the deployed position 76 with the movable pin 96 moving laterally and forward through the track 106. Likewise, when the user 78 pushes the cupholder assembly 44 in the deployed position 76 rearward towards the table 10 against the resistance of the spring 94, the movable pin 96 moves rearward with the cupholder subassembly 44 and advances rearward through the track 106, moving laterally as needed, to releasably engage the lock detent 108, thereby holding the cupholder subassembly 44 in the stowed position 74.

In an exemplary embodiment, to help control or otherwise dampen movement of the cupholder subassembly 44 between the stowed and deployed positions 74 and 76, the cupholder assembly 12 includes a dampening arrangement. The dampening arrangement includes a damper rack 110 that is coupled to the support frame 86 extending in the distal direction 50. As illustrated, the damper rack 110 has teeth 112. A rotary damper 114 is coupled to the cupholder body portion 90 of the cupholder subassembly 44. The rotary damper 114 is configured to control the rate of movement of the cupholder subassembly 40 and has teeth 116 that engage the teeth 112 of the damper rack 110 as the cupholder subassembly 44 moves between the stowed and deployed positions 74 and 76.

In an exemplary embodiment, the cupholder body portion 90 has cupholder openings 118 and 120 formed therethrough. Pivotally coupled to the cupholder body portion 90 is a cupholder bracket 122 that includes a cupholder support 123 that moves from a collapsed position when the cupholder subassembly 44 is in the stowed position 74 to a rotated position 124 when the cupholder subassembly 44 is in the deployed position 76. In the rotated position 124, the cupholder bracket 122 including the cupholder support 123 is disposed under the cupholder openings 118 and 120 for supporting a beverage container 126. In an exemplary embodiment, the including the cupholder support 123 of the cupholder bracket 122 is spaced apart from the cupholder openings 118 and 120 a distance of from about 50 to about 100 mm, for example about 50 to about 80 mm, when the cupholder bracket 122 is in the rotated position 124.

In an exemplary embodiment, the cupholder subassembly 44 includes adjustable clips 128 and 130 that are correspondingly disposed in the cupholder openings 118 and 120. The adjustable clips 128 and 130 are operatively coupled to the cupholder body portion 90, for example pivotably coupled and spring-loaded, to correspondingly move relative to the cupholder openings 118 and 120 to adjust an effective opening size of each of the cupholder openings 118 and 120 to receive various size beverage containers 126.

Figure 10:
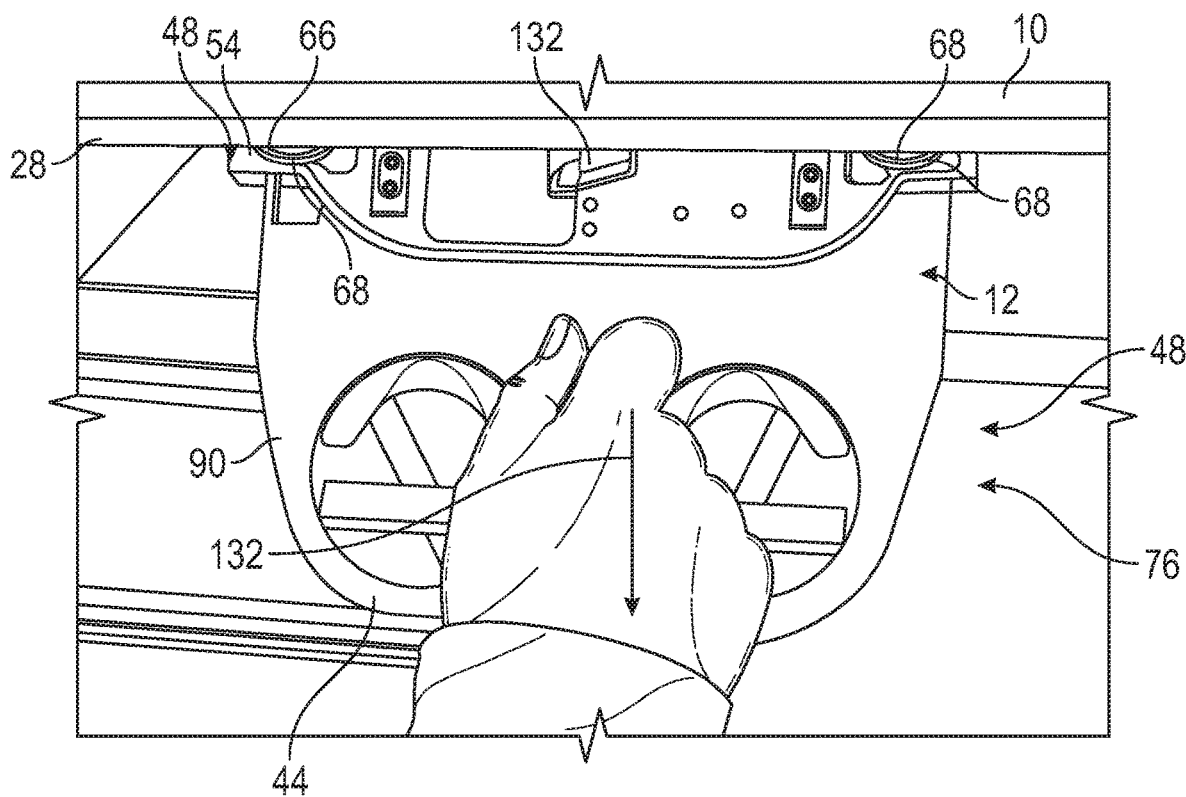
FIG. 10 illustrates a perspective top view of a portion of a table including a cupholder assembly being moved from a mounted, deployed position to a rotated, deployed position in accordance with an exemplary embodiment.

Referring to FIGS. 1, 4, 6, and 10, in an exemplary embodiment and as discussed above, the cupholder assembly 12 is configured to be frangible or to break away from the table 10 in the mounted position 46 when a force (indicated by single headed arrow 132) or predetermined load is applied to the cupholder subassembly 44. Advantageously, in the event that the cupholder subassembly 44 is in the deployed position 76 and is intentionally or unintentionally impacted by the force 132, the cupholder subassembly 44 moves from the mounted, deployed positions 46 and 76 to the rotated position 48 to prevent damage to the cupholder assembly 12. As discussed above, in an exemplary embodiment, in response to the force 132 applied to the cupholder subassembly 44, the magnets 68 breakaway or otherwise separate from the metal-containing area 66 to release the distal housing portion 54 of the housing 42 from the intermediate table section 28 to allow the housing 42 to move to the rotated position 48. In an exemplary embodiment, the cupholder assembly 12 further includes a spring clip 132 that is operatively coupled to the housing 42 (or alternatively the cupholder subassembly 44) to rotate, pivot or otherwise move from a stowed position as illustrated FIG. 6 (e.g., substantially planar with the housing 42) to a rotated locked position as illustrated in FIG. 10 when the housing 42 is moved to the rotated position 48.

Figure 11:
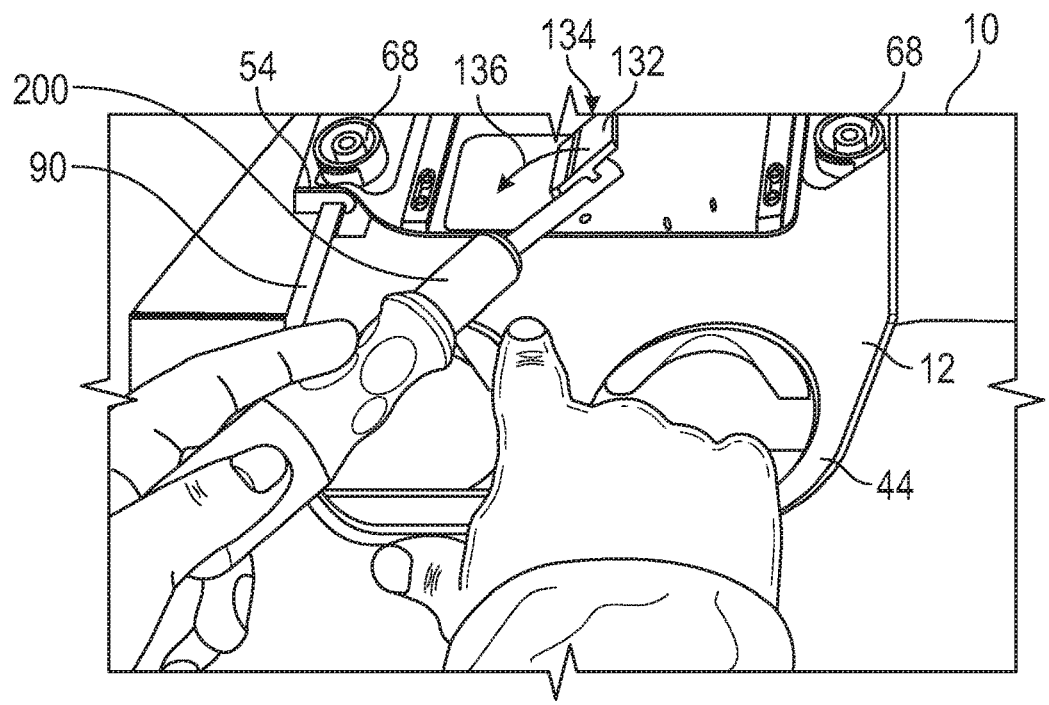
FIG. 11 illustrates a perspective top view of a portion of a table including a cupholder assembly being moved from a rotated, deployed position to a mounted, deployed position to in accordance with an exemplary embodiment.
Figure 12:
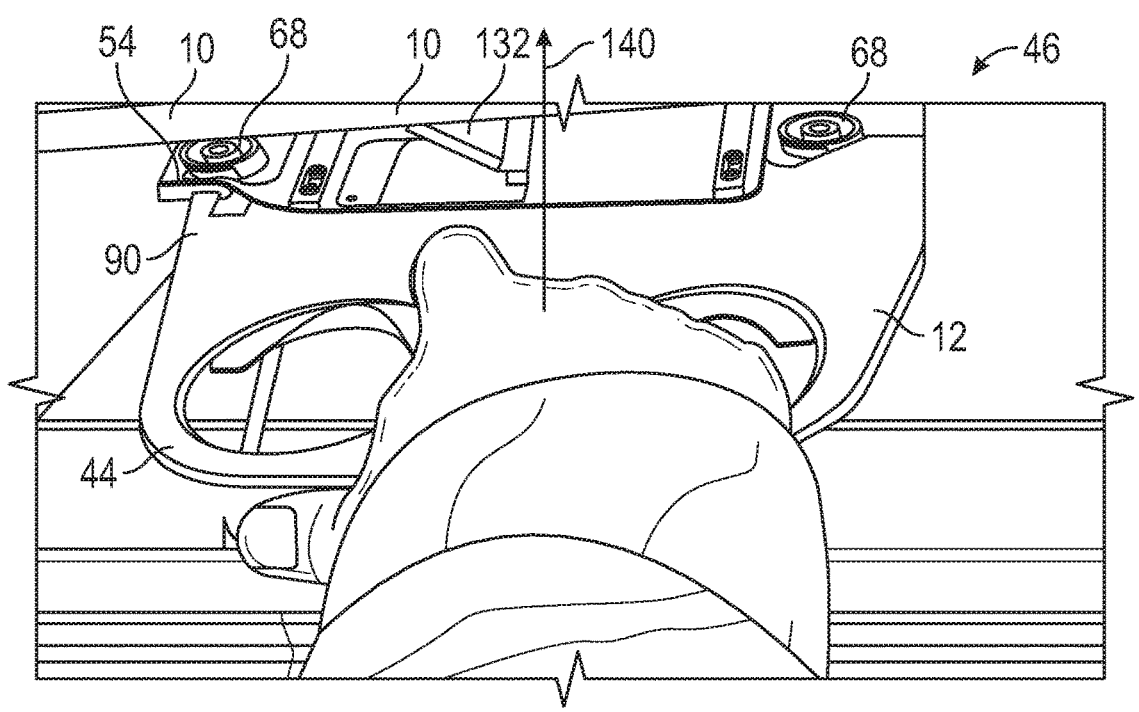
FIG. 12 illustrates a perspective top view of a portion of a table including a cupholder assembly being moved from a rotated, deployed position to a mounted, deployed position to in accordance with an exemplary embodiment.

Referring also to FIGS. 11-12, in an exemplary embodiment, the housing 42 and the cupholder subassembly 44 are returned from the rotated position 48 to the mounted, deployed position 46 and 76. In an exemplary embodiment, this may be done by manually moving the spring clip 132, for example with a device 200 such as a screwdriver, pen, pencil, or other elongated device, from the rotated locked position in a direction (indicated by single headed arrow 136) back to or towards the stowed position and applying an upward force (indicated by single headed arrow 140) to the cupholder subassembly 44 to rotate the housing 42 and the cupholder subassembly 44 to the mounted, deployed position 46 and 76, allowing the magnets 68 to re-engage the metal-containing area 66 to hold the cupholder assembly in the mounted position 46. In an exemplary embodiment, advantageously the spring clip 132 in the rotated locked position is a safety mechanism that prevents a person from getting their fingers caught between the cupholder assembly 12 and the table 10 when returning the cupholder assembly 12 from the rotated position 48 to the mounted, deployed position 46 and 76 because the spring clip 132 in the rotated locked position would otherwise interfere with the bottom of the table 10 without first being moved to or towards the stowed position with the device 200.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A cupholder assembly adapted to be mounted to a support structure, the cupholder assembly comprising:
    a housing extending in a distal direction from a proximal housing portion to a distal housing portion and configured to pivotally couple to the support structure to move between a mounted position and a rotated position that is rotated relative to the mounted position; and
    a cupholder subassembly slidingly coupled to the housing to move between a stowed position substantially within the housing and a deployed position extending from the housing in the distal direction, wherein the cupholder subassembly further comprises a cupholder body portion and a movable pin extending from the cupholder body portion towards the housing, wherein the housing has a releasable lock member that comprises a raised outer portion partially surrounding and spaced apart from a raised intermediate portion to define a track therebetween, wherein the raised intermediate portion has a lock detent, and wherein the movable pin is configured to be advance through the track during movement of the cupholder subassembly between the stowed position and the deployed position and to releasably engage the lock detent to hold the cupholder subassembly in the stowed position.

2. The cupholder assembly of claim 1, wherein the cupholder assembly further comprises a mounting bracket that is pivotally coupled to the proximal housing portion about a first rotational axis and that is configured to be mounted to the support structure.

3. The cupholder assembly of claim 2, wherein the distal housing portion is configured to releasably couple to the support structure to hold the housing in the mounted position and to allow the housing to move between the mounted position and the rotated position about the first rotational axis when the distal housing portion is released from the support structure.

4. The cupholder assembly of claim 1, wherein the housing has a bearing rail extending in the distal direction and the cupholder subassembly comprises a bearing carriage that is coupled to the cupholder body portion and that is slidingly coupled to the bearing rail to guide the cupholder subassembly to move between the stowed position and the deployed position.

5. The cupholder assembly of claim 4, wherein the cupholder subassembly further comprises a spring that is coupled to the cupholder body portion and the housing to bias the cupholder subassembly in the deployed position.

6. A cupholder assembly adapted to be mounted to a support structure, the cupholder assembly comprising:
    a housing extending in a distal direction from a proximal housing portion to a distal housing portion and configured to pivotally couple to the support structure to move between a mounted position and a rotated position that is rotated relative to the mounted position; and
    a cupholder subassembly slidingly coupled to the housing to move between a stowed position substantially within the housing and a deployed position extending from the housing in the distal direction, wherein the housing has a bearing rail extending in the distal direction and the cupholder subassembly comprises a bearing carriage that is coupled to the cupholder body portion and that is slidingly coupled to the bearing rail to guide the cupholder subassembly to move between the stowed position and the deployed position, wherein the housing comprises a damper rack that extends in the distal direction and the cupholder subassembly further comprises a rotary damper that is coupled to the cupholder body portion and that meshes with the damper rack to dampen movement of the cupholder subassembly between the stowed position and the deployed position.

7. The cupholder assembly of claim 4, wherein the cupholder body portion has a cupholder opening formed therethrough and the cupholder subassembly comprises a cupholder bracket that is pivotally coupled to the cupholder body portion to move from a first position when the cupholder subassembly is in the stowed position to a second position when the cupholder subassembly is moved to the deployed position, wherein the cupholder bracket comprises a cupholder support that is pivotably coupled to the cupholder body portion and that is disposed under the cupholder opening when the cupholder bracket is in the second position for supporting a beverage container.

8. The cupholder assembly of claim 7, wherein the cupholder bracket is spaced apart from the cupholder opening a distance of from about 50 to about 100 mm when the cupholder bracket is in the second position.

9. The cupholder assembly of claim 7, wherein the cupholder subassembly further comprises an adjustable clip that is disposed in the cupholder opening and is operatively coupled to the cupholder body portion to move relative to the cupholder opening to adjust an effective opening size of the cupholder opening for receiving the beverage container.

10. A table comprising:
    a tabletop having an upper surface for supporting an object and a lower surface opposite the upper surface, wherein the tabletop comprises an intermediate table section having an intermediate table edge and a foldable leaf section that is pivotally coupled to the intermediate table section adjacent to the intermediate table edge to move from an extended position extending distally from the intermediate table section to a folded position overlying the upper surface of the intermediate table section; and
    a cupholder assembly mounted to the tabletop, the cupholder assembly comprising:
        a housing pivotally coupled to the tabletop to move between a mounted position adjacent to the lower surface and a rotated position that is rotated relative to the mounted position, wherein the housing extends in a distal direction from a proximal housing portion to a distal housing portion, wherein the proximal housing portion is pivotally coupled to the tabletop and the distal housing portion is releasably coupled to the tabletop to allow the housing to move between the mounted position and the rotated position when the distal housing portion is released from the tabletop; and a cupholder subassembly slidingly coupled to the housing to move between a stowed position substantially within the housing and a deployed position extending distally from the housing, and wherein the cupholder assembly is mounted to the lower surface of the intermediate table section.

11. The table of claim 10, wherein the housing in the mounted position is substantially parallel to the lower surface of the tabletop.

12. The table of claim 11, wherein the housing in the rotated position is positioned at an angle of from about 45° to about 90° relative to the lower surface of the tabletop.

13. The table of claim 10, wherein the tabletop comprises a metal-containing area that is disposed along the lower surface, and wherein the housing further comprises a magnet that is coupled to the distal housing portion and that releasably couples to the metal-containing area to hold the housing in the mounted position and that releases from the metal-containing area in response to a force applied to the cupholder subassembly.

14. The table of claim 10, wherein the cupholder assembly is disposed adjacent to the intermediate table edge and is substantially covered by the intermediate table section when in the stowed position, and wherein the cupholder subassembly extends distally away from the intermediate table section when in the deployed position.

15. The table of claim 14, wherein the cupholder subassembly is exposed when in the deployed position and the foldable leaf section is in the folded position.

16. The table of claim 10, wherein the cupholder assembly includes a spring clip that is operatively coupled to the cupholder assembly to move from a clip stowed position to a clip rotated locked position when the housing is moved to the rotated position, wherein the spring in the clip rotated locked position obstructs the cupholder assembly from returning to the mounted and deployed positions, and wherein the spring clip is moveable by an elongated device from the clip rotated locked position towards the clip stowed position for returning the housing and the cupholder subassembly to the mounted and deployed positions.

17. The table of claim 10, wherein the cupholder assembly further comprises a mounting bracket that is pivotally coupled to the proximal housing portion about a first rotational axis and that is mounted to the intermediate table section, and wherein the distal housing portion is releasably coupled to the intermediate table section to hold the housing in the mounted position and to allow the housing to move between the mounted position and the rotated position about the first rotational axis when the distal housing portion is released from the intermediate table section.

* * * * *